INVENTOR.
DAVID WESTON
BY
ATTORNEYS

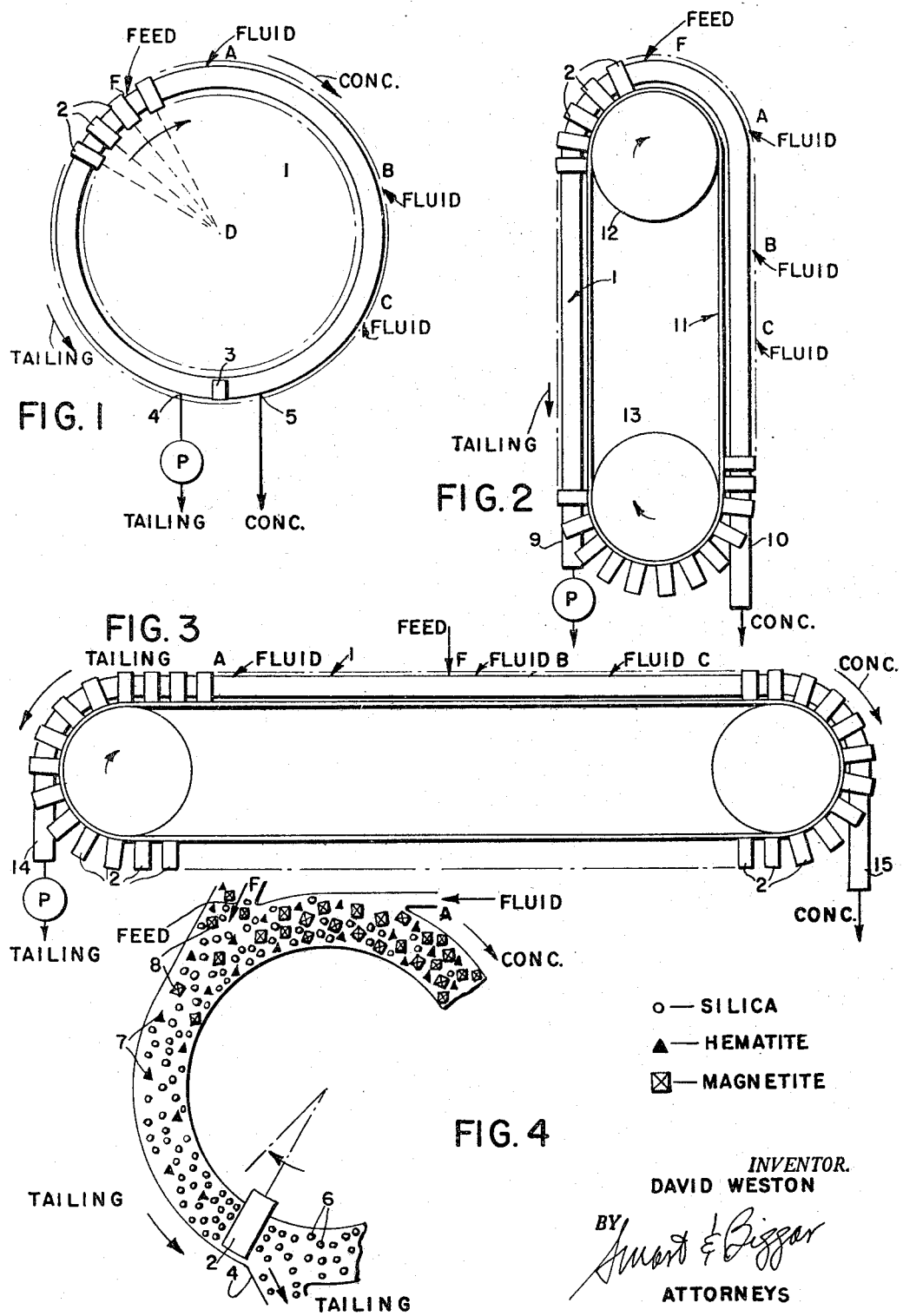
Dec. 6, 1966   D. WESTON   3,289,836
METHOD AND APPARATUS FOR THE MAGNETIC SEPARATION
OF PARTICULATE MATERIALS
Filed Oct. 14, 1964   10 Sheets-Sheet 1
INVENTOR.
DAVID WESTON
BY
ATTORNEYS Dec. 6, 1966 D. WESTON 3,289,836
METHOD AND APPARATUS FOR THE MAGNETIC SEPARATION
OF PARTICULATE MATERIALS
Filed Oct. 14, 1964 10 Sheets-Sheet 2
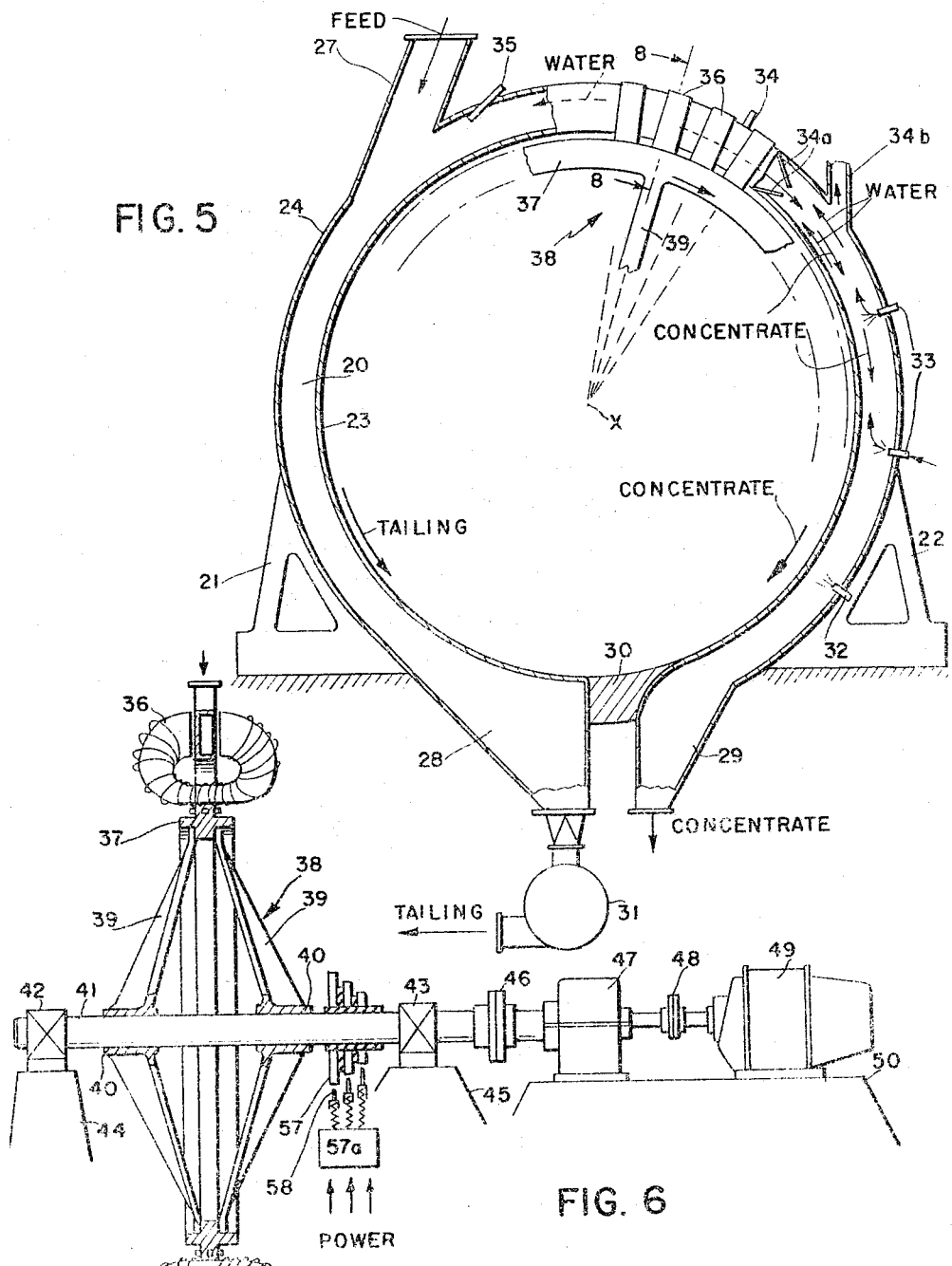
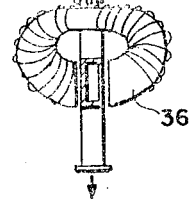
*INVENTOR.*
DAVID WESTON
BY
ATTORNEYS

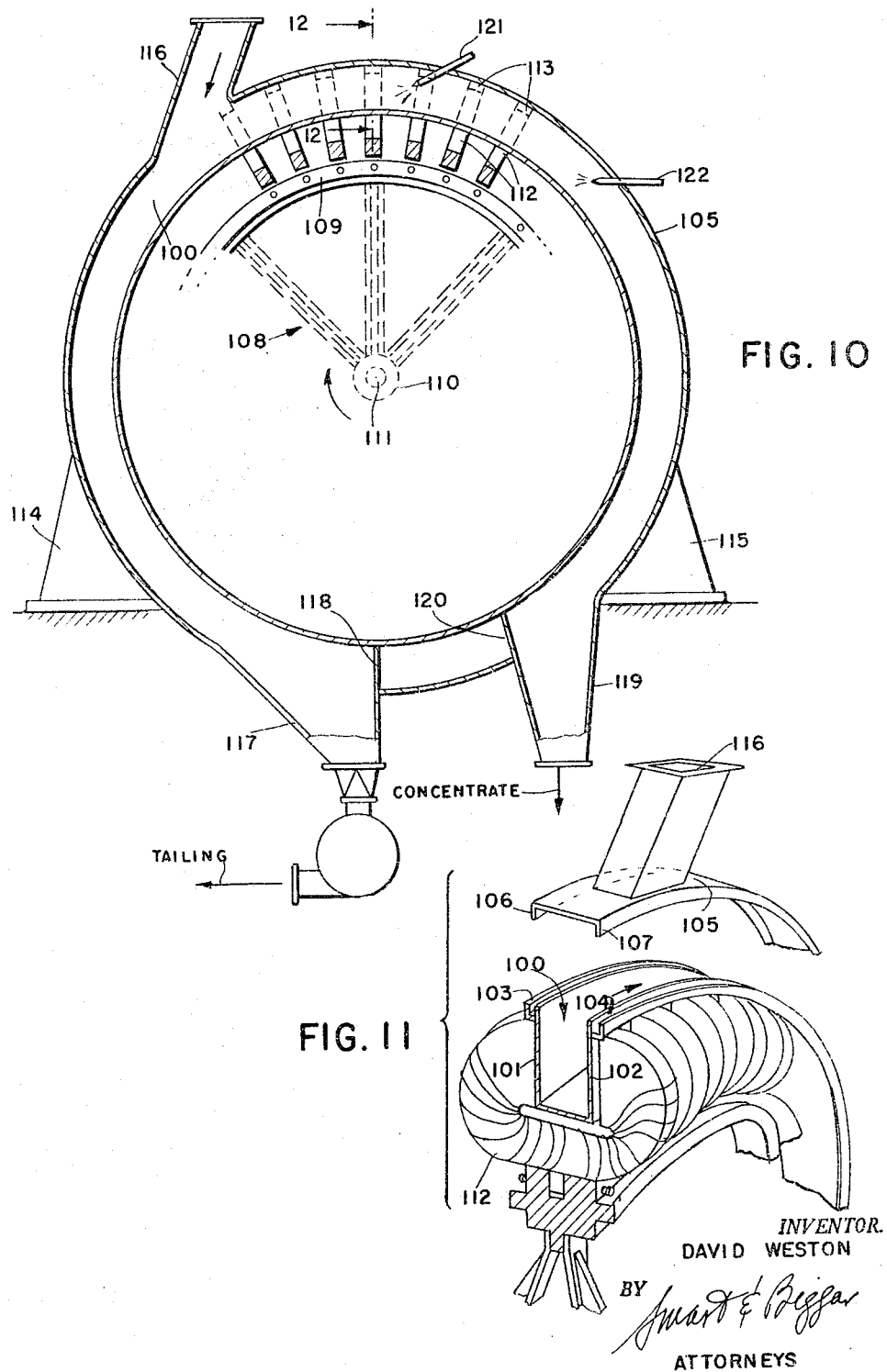

Dec. 6, 1966    D. WESTON    3,289,836
METHOD AND APPARATUS FOR THE MAGNETIC SEPARATION
OF PARTICULATE MATERIALS
Filed Oct. 14, 1964    10 Sheets-Sheet 7

INVENTOR.
DAVID WESTON
BY
ATTORNEYS

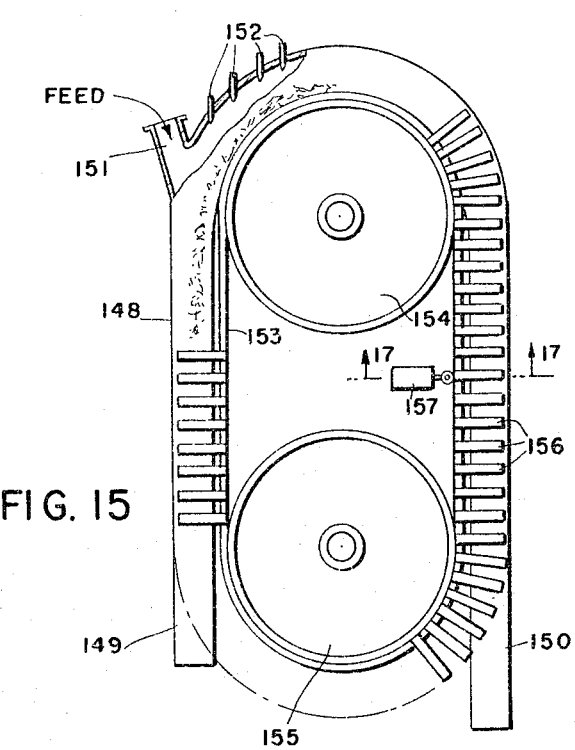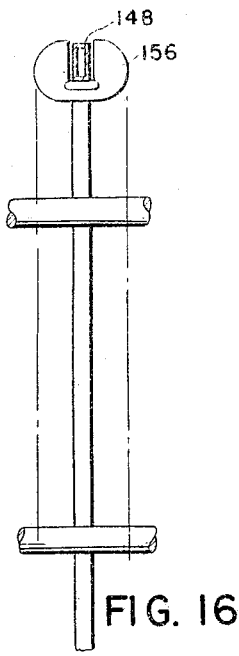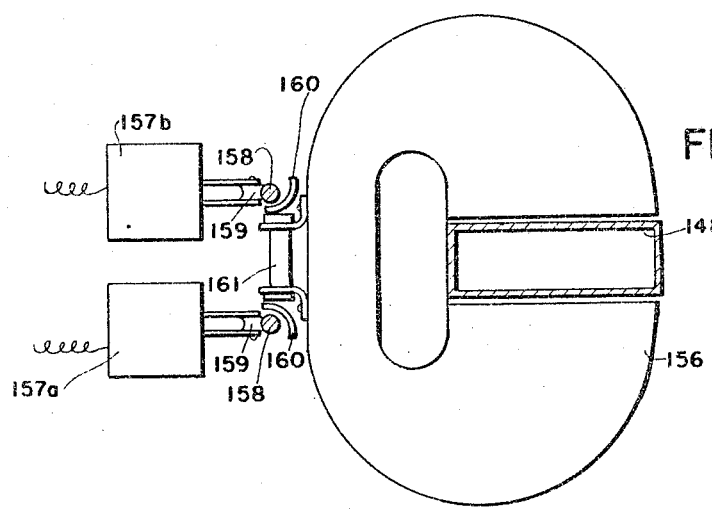

Dec. 6, 1966  D. WESTON  3,289,836
METHOD AND APPARATUS FOR THE MAGNETIC SEPARATION
OF PARTICULATE MATERIALS
Filed Oct. 14, 1964  10 Sheets-Sheet 9

*INVENTOR.*
DAVID WESTON
BY
ATTORNEYS

Dec. 6, 1966      D. WESTON      3,289,836
METHOD AND APPARATUS FOR THE MAGNETIC SEPARATION
OF PARTICULATE MATERIALS
Filed Oct. 14, 1964      10 Sheets-Sheet 10
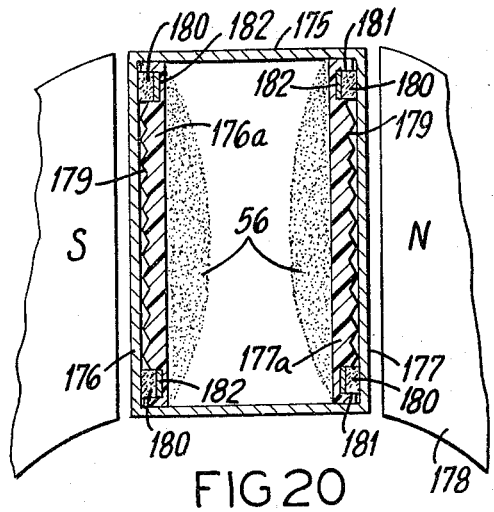
FIG. 20
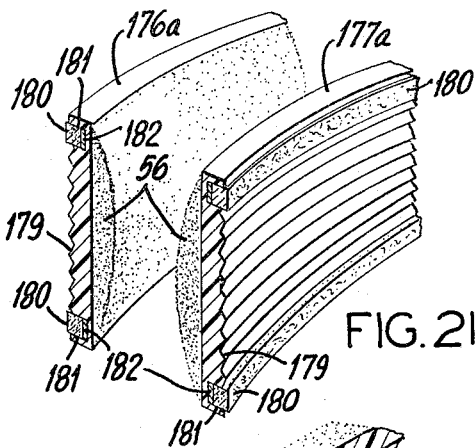
FIG. 21
FIG. 21a
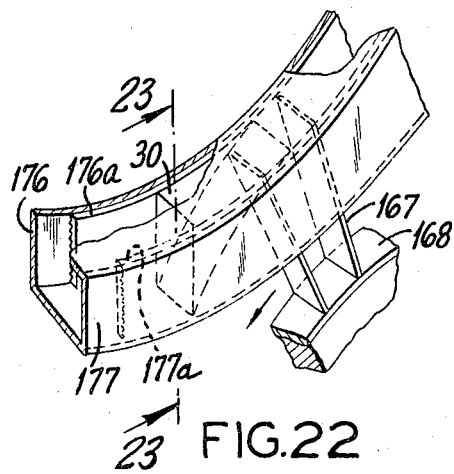
FIG. 22
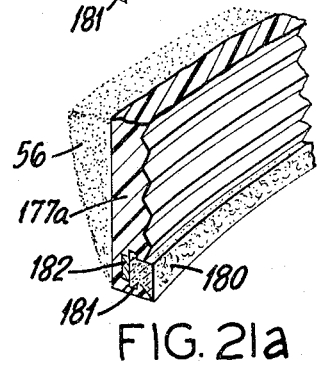
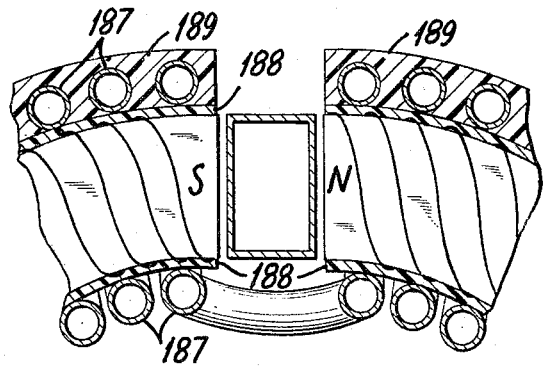
FIG. 25
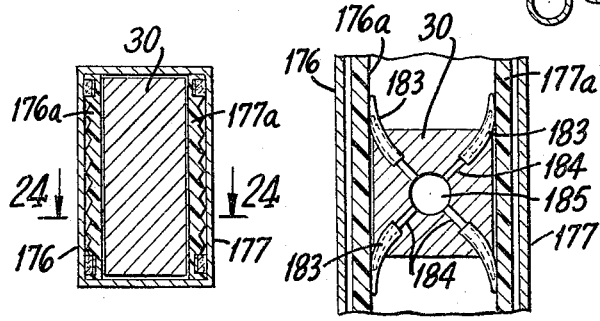
FIG. 23      FIG. 24
INVENTOR.
DAVID WESTON
BY
*Smart & Biggar*
ATTORNEYS

3,289,836
METHOD AND APPARATUS FOR THE MAGNETIC SEPARATION OF PARTICULATE MATERIALS
David Weston, 129 Adelaide St. W., Toronto, Ontario, Canada
Filed Oct. 14, 1964, Ser. No. 403,796
27 Claims. (Cl. 209—214)

This application is a continuation-in-part of my co-pending application Serial No. 77,895, filed December 23, 1960, now abandoned.

This invention relates broadly to a method and apparatus for separating materials of different magnetic susceptibilities and particularly to a method and apparatus for the treatment of ores containing weakly magnetic materials. The invention is also concerned with the single step concentration of at least two minerals comprising weakly and strongly magnetic material from material lower in magnetic susceptibility than the weakest magnetic material that it is desired to concentrate. The invention is applicable to both wet and dry concentration and applicable to materials of a wide range of magnetic susceptibilties ranging from the highest-susceptible material such as iron to one of the lower susceptible minerals such as corundum.

Large bodies of low grade iron ores are known to exist in various parts of the United States and Canada which because of their relatively high content of silica, silicates and other gangue materials have been unsuitable for direct use in the blast furnace or as charge material in other types of conventional smelting apparatus. Because the high grade ore desposits are gradually diminishing, it has become imperative to develop economical means for the treatment of the low grade deposits, particularly those containing either hematite alone in a finely divided state, or alternatively, mixtures of hematite and magnetite.

Attempts to solve this problem by magnetic concentration have not been wholly satisfactory. For one thing, conventional magnetic concentrators by the very nature of their design are unable to handle the ore economically at high tonnage rates. For another thing, some ores, like low grade iron ores, in which the material to be recovered is present in the form of a weakly magnetic constituent as well as a strongly magnetic constituent, are difficult to handle economically, particularly in situations where it is desirable to recover both the magnetically weak and magnetically strong material simultaneously in a substantially one step operation. This would particularly be the case in the treatment of low grade iron ore containing magnetite and hematite, the relatively attractability of the former to a magnetic element, other things being equal, being upwards of about 30 times greater than that for the latter. Thus, where it is desired to recover hematite as well as magnetite, a high intensity field of the order of at least about 17,000 gauss might be required. However, this generally poses serious operating problems.

For example, when an ore of the foregoing type is immediately brought under the influence of a high intensity field, such as might occur in the conventional drum type magnetic concentrator, the attraction of the magnetite to a particular magnetic element may be so great as to cause clogging of the relatively restricted passageway through which the ore is fed, thus adversely affecting the production rate. In addition, the sudden collection or clumping of the magnetic particles in the region of and across the magnetic poles tends to act as a magnetic keeper in concentrating the flux through the attracted material, whereby the field remaining outside the bridged poles is rendered too weak to attract the hematite which it is desired also to collect. In some situations, the sudden clumping of the magnetite particles may be such as to entrap gangue particles, thus lowering the grade of the concentrate and defeating the purpose of the separation. In addition, where a high intensity field must be used to recover the lowest susceptible material, such as hematite, the higher susceptible material, such as magnetite, tends to cling to the poles with high forces and is most difficult to remove in a continuous operation.

To overcome the foregoing difficulties, dry methods have been proposed wherein the material is first subjected to low intensity separation in order to remove selectively the magnetite and wherein the tailing is thereafter treated in a high intensity separator to remove the hematite. As this entailed at least two separate steps either in the same separator or by means of two or more different separators, the economics of the treatment were not too favorable. In addition, the high intensity step necessitated the use of low capacity machines, which again would only produce an acceptable grade of concentrate on comparatively coarse material. In other words, if fine grinding was required to liberate the hematite, the process would not work as part of the fine gangue material also collected with the concentrate.

Although many attempts have been made to overcome the foregoing disadvantages, none, as far as I am aware, have been successful in providing a satisfactory solution to the problem and at the same time in providing an improved method and apparatus capable of achieving the results in substantially a one or even a two step operation at a high production rate.

Wtih minerals of lower magnetic susceptibility than even hematite, such as manganite, magnetic fields of as high as 35,000 gauss may be required for the concentration of this mineral of which there exists no commercial method.

It is an object of my invention to provide a magnetic separation method for treating particulate materials characterized by different magnetic susceptibilities.

Another object is to provide a method for treating ore containing materials of different magnetic susceptibilities wherein at least one material having a magnetic susceptibility above a given value is separated from at least one material having a magnetic susceptibility at or below said given value.

A further object is to provide a method for the continuous magnetic separation of at least one material from at least one other material based on the differences in magnetic susceptibilities by using a substantially one step method.

A further important object is to provide an economic method and apparatus in a continuous process for the magnetic concentration of material with very low magnetic susceptibilities requiring feed strengths of at least 25,000 gauss, preferably at least 35,000 gauss.

Still another object is to provide various apparatus embodiments for carrying out the method aspects of my invention.

These and other objects will more clearly appear when taken in conjunction with the disclosure and the accompanying drawings, wherein:

FIGS. 1 to 3 shows diagrammatically various embodiments of the method which may be employed in carrying out the invention;

FIG. 4 depicts graphically the general distribution of the various constituents of a material in a fluid medium when carrying out one embodiment of the invention;

FIGS. 5 to 8 are illustrative of a group of elements which make up one embodiment of the invention in carrying out one aspect of the method, FIG. 8 being a section through line 8—8 of FIG. 5;

FIGS. 10 to 12 are illustrative of elements which cooperate to form another apparatus combination of the invention, FIG. 12 being a section through line 12—12 of FIG. 10;

FIGS. 15 to 17 depict an inverted U type separator utilizing the principle shown by the diagrammatic representation of FIG. 3;

FIG. 20 shows another embodiment of the invention in which movable annular rings are employed as side walls of a hollow circular column or casing in order to minimize wearing of the column;

FIGS. 21 and 21a depict fragmentarily a preferred construction of the annular rings;

FIG. 22 illustrates a portion of the circular column showing in three dimensions the position of the annular rings relative to the other elements of the apparatus in the discharge region;

Figure 26:
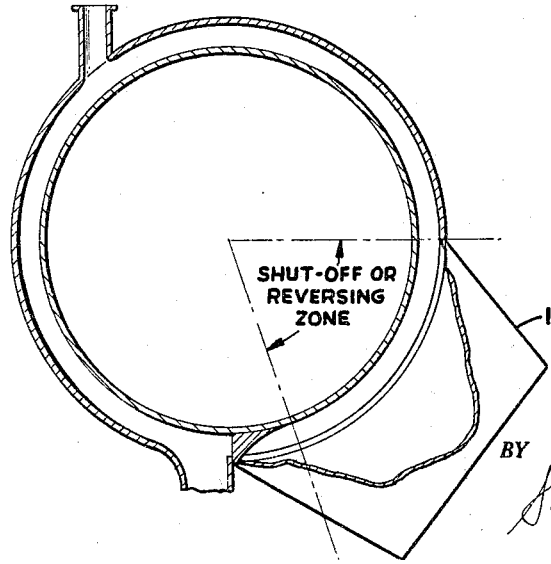

FIGS. 23 and 24 are views of FIG. 22 taken along lines 23—23 and 24—24, respectively;

FIG. 25 is illustrative of one embodiment of an electromagnet utilizing cooling coils to dissipate heat generated therein; and FIG. 26 depicts an embodiment of the apparatus showing diagrammatically a method for removing magnetic concentrate therefrom.

The present invention is based on an improvement which enables the use of any desired practical magnetic intensity field to concentrate a wide range of materials at comparatively large tonnage rates, regardless of the heterogeneous nature of the material being treated, providing a certain group of related and cooperative steps is followed in carrying out my inventive concept.

Broadly stated, the method aspect of my invention is concerned with the magnetic separation of particulate materials characterized by different magnetic susceptibilities which comprises feeding said material into an elongated columnar pathway, subjecting substantially the entire cross-section of said columnar pathway throughout substantially its whole length to an externally produced magnetic flux which has a magnetic gradient along said columnar pathway and which is of an intensity selective of a material of a particular magnetic susceptibility, confining substantially the whole length of said pathway between a series of poles of opposite polarity producing said flux, the spacing of the magnets along the columnar pathway being at least sufficient to provide a series of flux gradients therealong, moving said poles lengthwise of the pathway to perform concentration lengthwise of said columnar pathway, whereby a magnetic concentrate and tailing are formed in said pathway, and collecting said concentrate and collecting said tailing.

In one embodiment of the invention, I may confine the material in a columnar pathway substantially circular in shape as shown diagrammaticlly in FIG. 1. In another embodiment, I may confine the material in a columnar pathway shown diagrammatically as an inverted U in FIG. 2; and in still another embodiment I may confine the material in a columnar pathway of the type shown diagrammatically in FIG. 3. It is to be understood I am not to be limited to the types illustrated in these figures, it being apparent that many variations of columnar pathways can be resorted to to obtain the results of the invention. Such columnar pathways may be vertically disposed or on an angle, or even horizontal.

Referring to FIG. 1, I show diagrammatically one aspect of my method in which I confine the material in a substantially circular pathway indicated generally by the numeral 1. Feed material is fed continuously at point F of the pathway. The feed may be associated with a fluid such as air, or other gas, or a liquid such as water. Substantially the whole length of the columnar pathway is subjected to an externally produced magnetic flux via a continuous series of peripherally spaced electro-magnets 2, said magnets being U shaped with their legs straddling transversely both sides of the columnar pathway so that the leg containing the north pole is on one side and the leg containing the south pole is on the opposite side of the pathway. The magnets may be substantially uniformly spaced along the whole periphery of the columnar pathway, only a few being shown to illustrate their general position, the magnets being adapted to move clockwise along the periphery with D as their focal point. The magnets are separated from each other at least sufficiently to insure flux gradients along the columnar pathway and to optimize the efficiency of the process. The pathway is blocked at 3 to facilitate removal of the concentrate and to maintain separation between the tailing and the concentrate end portions of the column.

In this embodiment, as material is fed into the column at point F, the magnets are caused to rotate clockwise about D, the material moving countercurrent to the movement of the magnets. Fluid, for example, water, may be fed along portions of the column, e.g., at A or B or C or at two or at all three or more points along the pathway to effect a continuous washing action and flow of the material being treated, a pump P being provided to the left of block-off 3 to effect a continuous countercurrent flow of the material in the pathway. Assuming the feed to be a low grade iron ore containing magnetite, hematite and silica or other gangue material, during start up of the cycle as the magnets whose field intensity have been adjusted to be selective at least to hematite approach feed point F, magnetite particles because of their high magnetic susceptibility are attracted to the inside wall of the pathway (note FIG. 8) adjacent a forward group of moving magnets and are carried with the magnets along the wall towards point A. The area below feed point F having become deficient in magnetite will contain some hematite and silica (note FIG. 4 to be explained later). The follow up magnets will attract the hematite first, separate it from the silica and carry it toward feed inlet F where the magnetite is then picked up since the residual field strength will be sufficient to recover the more permeable magnetite. Thus, the feebly magnetic hematite will always be recovered first as there will always be a fresh group of magnets to pick it up first and transfer it to the right side of the column along with the subsequently attracted magnetite. As indicated in the diagram of FIG. 1, the tailing is brought downstream to the region indicated by 4 via pump P while the concentrate is formed and brought upstream in the region of point 5 where it is removed. After a steady state has been achieved, tailing will be removed continuously at 4 by pump P while the concentrate will be removed continuously at 5.

The foregoing will be more clearly understood by referring to the partial graphical representation of FIG. 4 which illustrates roughly what the conditions may be after a substantially steady state has been reached, it being understood that the graphical representation is by way of illustration and not by way of limitation. Assuming the ore is the same as aforesaid, a tailing of substantially silica 6 (circles) is shown at exit port 4. Just above the tailing discard and before magnet 2 (it is to be understood that there are a plurality of spaced magnets about substantially the whole periphery), some particles 7 of hematite are shown (solid triangles) to be retrieved first by magnets moving clockwise along the columnar pathway. At feed point F, the ore is shown entering the pathway comprising silica 6 (circles), hematite 7 (solid triangles) and magnetite 8 (squares inscribed with crosses). As the magnets sweep by inlet port F, a substantial portion of the magnetic particles are gathered up by then over the attracted hematite and, assuming some bridging of magnetite occurs across the moving magnetic poles, whereby the additional hematite particles are not magnetically retrieved, these will be immediately picked up first by the substantially clean trailing magnets downstream of the flow as described hereinbefore.

In carrying out the method, it is preferred for optimum results that the rate of feed of material be adjusted in accordance with the speed of movement of the magnets, and the field intensity employed and the amount of magnetically susceptible material within the field intensity setting, so that at lease some of the magnets operate below their saturation carrying capacity. This is important for if the rate of feed is so great that the magnets are always operating at full carrying capacity, part of the magnetically susceptible material will be lost in the tailing. The feed rate most desirable for efficient operation can be easily determined by analyzing the tailing and the concentrate and adjusting the feed rate accordingly until the desired tailing and concentrate are obtained for the particular ore in question.

Where washing of the concentrate to remove entrained waste material is not important, the magnetic field may be cut off at approximately point A (FIG. 1) and the concentrate more readily removed from the column as it will be comparatively free of the influence of the magnetic field. In such an arrangement, an individual power source would be required for each magnet and a make-break relay system, well known to the art, used to cut off the power of the magnets at about point A and arranged to make power contact beyond the concentrate-discharge point 5 and before the tailing discharge point 4. Thus, broadly speaking, a magnetic field need only be applied to the material along at least the material recovery length of the columnar pathway, for example, the material recovery length shown as that existing from the tailing end point 4 up to about the feed inlet point F. The remaining zone from F to 5 may be considered as the cleaning zone. Or, if desired, the magnetic field may be cut-off in the region of point 5 where the residual magnetism will not interfere with easy removal of the concentrate.

Another variation of my method is shown diagrammatically in FIG. 2 in which the columnar pathway confining the material is shown as an inverted U, it being understood that such a pathway could also be horizontally disposed if desired. The columnar pathway indicated generally by numeral 1 has a trailing-receiving leg portion 9 and a concentrate-receiving leg portion 10, the leg portion 10 being extended beyond the influence of the magnetic field to insure easy removal of the concentrate. Magnets 2 are movably and continuously spaced along the pathway as in FIG. 1 except that magnets are integral with an endless chain diagrammatically indicated by numeral 11, actuated by suitably motivated sprockets 12 and 13. Feed material which may be associated with a fluid such as air or water would be fed into the column at F or other suitable point thereof countercurrent to the movement of the magnets. As in FIG. 1, fluid inlet ports, e.g., A, B, or C, may be provided to wash the magnetically attracted magnetite free from silica or as gangue, as pump P being provided, if necessary, at the tailing-receiving leg portion of the column in order to maintain a desired flow of the feed in the column. As stated hereinbefore, the rate of feed of material should be adjusted in accordance with the magnetic conditions prevailing along the pathway so that optimum efficiency of operation will be assured.

The diagrammatic representation shown in FIG. 3 is in some respects similar to that of FIG. 2 except that the U portion is a substantially straight and horizontal column having legs 14 (for receiving the tailing) and 15 (for receiving the concentrate), the series of spaced magnets 2 being similarly movably spaced along substantially the whole length of the column via a chain drive of the type illustrated in FIG. 2. The feed material is fed at F, substantially in the center of the column, or at any other desirable point, a pump P being preferably provided as in the other examples to effect flow of fluid injected either at points A, B or C, or other points where desired, towards the tailing receiving leg 14. The separation effected by the continuously moving magnets would be similar to that described for the diagrammatic representation of FIG. 1.

While the foregoing embodiments illustrate the use of countercurrent flow in effecting separation, it should be understood that the method need not be so limited. For example, the movement of the magnets may be concurrent with that of the feed material in the column. I prefer in this case that the magnets move faster relative to the movement of the material, although it is possible to effect separation where both are moving at almost the same speed by virtue of the turbulence developed in the stream due to the baffling effect of the material collected on the inner wall of the column across the poles of the moving magnets, or the magnets may move slower depending upon the grade of the feed and the difference in the magnetic susceptibility in the material being collected, and the gangue.

In carrying out the various method embodiments of the invention, the apparatus in its broad aspects may comprise an elongated column for confining the material to be treated, feed means associated with a portion of the column, discharge means for said concentrate and for said tailing associated with other portions of said column and magnetic flux producing means associated externally of and along at least the material recovery length of said column, said flux producing means being adapted to produce a flux substantially across the entire cross section of the column with magnetic gradients along the length thereof, and means for moving said magnetic flux producing means longitudinally of said column. The apparatus may be adapted for either wet or dry concentration. In the case of wet concentration, a fluid, such as water, may be employed in transporting the material along the column while in the case of dry separation, gravity feeding may be employed associated with a gas, such as air, to aid in effectively separating the non-magnetic material from the attracted magnetic material.

A preferred embodiment of the apparatus is shown partially in FIGS. 5 and 6.

Referring to FIG. 5, a stationary circular column or hollow shell 20 is shown of rectangular cross section partially broken away to more clearly show the various parts thereof. The shell is formed of substantially non-magnetic material such as wood, fiber glass, hard natural or synthetic rubber, high strength plastic, or the like. The circular column is supported by abutments 21, 22 suitably fixed to a supporting surface. As illustrative of one size of the circular column which may be employed to give reasonably high production rates, the internal diameter may be 8 feet, the rectangular cross section corresponding to an upstanding rectangle of about 8″ high and 4″ wide and having a wall thickness of about ⅜ inch. The bottom of the rectangular cross section is determined by inner periphery 23 of the column, the top being determined by outer periphery 24, the side walls being formed by annular side portions 25 and 26 (note FIG. 7).

The column is provided with a feed chute 27 which enters the column through outer periphery 24. The lower portion of the circular column is provided with a tailing-receiving portion 28 which extends downward from the circular column and is separated from the downwardly extending concentrate-receiving portion 29, the two portions being separated or sealed off from each other by means of block-off 30. A pump 31 is provided for removing the tailing from the tailing-receiving portion and to insure countercurrent flow of the material when it is desirable to do so.

About the periphery of at least a portion of the circular column are provided means 32 to 35 for injecting fluid, e.g. water, into the system for washing the concentrate as it is moved clockwise within the column by virtue of the flux producing means externally positioned to move clockwise along the column. Cleaning baffles 34a may be provided within the column to aid in effecting the cleaning of the concentrate as water is added at orifices 32, 33, etc. Waste removal outlet 34b located clockwise of the baffles may also be provided for removing waste slimes with a pump or other means which tend to accumulate near the concentration portion of the column. In the embodiment of FIGS. 5 to 8, the flux producing means comprise electro-magnets 36 integrally connected along the whole periphery of rim 37 of wheel 38 whose spokes 39 (note also FIG. 6) connect to hub 40 which is supported on a shaft 41 which is mounted to pass transversely through the radial center X of the circular column. The wheel shaft is journaled at bearings 42, 43 mounted on pillow blocks 44, 45. The shaft is connected via coupling 46 through variable speed control box 47 and coupling 48 to meter 49, the motor and speed control box both being rigidly fixed to support block 50.

Figure 8:
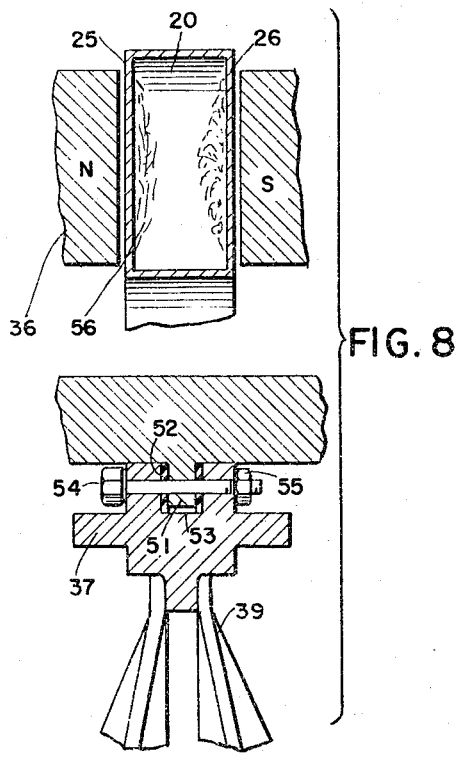
Figure 7:
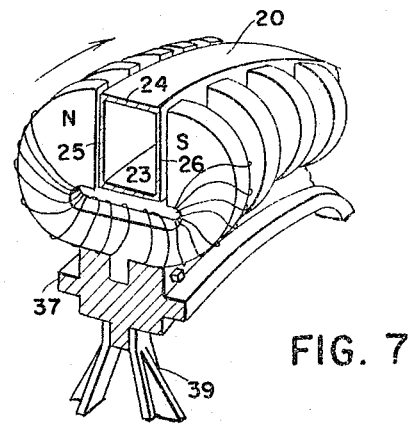

The connection of magnets 36 to rim 37 of the wheel is shown in FIGS. 6 and 7 and in more detail in the cross section of FIG. 8 taken along lines 8—8 through one of the magnets as shown in FIG. 5. A U shaped magnet is employed as shown in FIG. 7 and partially in FIG. 8 in which the north and south poles are disposed on opposite sides of the rectangular cross section, substantially each of the sides being wholly embraced by each of the poles.

The connection of the electro-magnets to the rim is more clearly indicated in the partial cross section of FIG. 8 which shows only a portion of the north and south poles wholly embracing upstanding sides 25 and 26 of the column 20, the lower portion of the electro-magnet having an extension 51 which fits into a corresponding groove 53 of the rim in tight engagement with annular gaskets 52. A bolt 54 and nut 55 are provided for rigidly attaching the magnets to the rim in the spacial relationship shown in FIG. 7. Within the column embraced by the magnet shown in FIG. 8, magnetic particulate matrial 56 is indicated as it apparently appears adjacent the walls 25, 26 under the magnetizing influence of the magnetic poles. As the poles move longitudinal of the column, that is along the columnar pathway, the magnetic material moves in the same direction with it to the concentrate receiving portion of column 20.

The electric wiring about the core of the magnet shown in FIGS. 6 and 7 is not meant to be as indicated. The wire is only shown diagrammatically for convenience. Actually, layers upon layers and turns upon turns of wire would be required to produce a magnet having the carrying capacity of the type required for carrying out my invention. The electromagnets are preferably electrically connected in parallel. Power to the magnets is brought into the rotating assembly by means of slip rings 57 on rotating shaft 41 and brushes 58 mounted on a stationary member. A field strength regulator 57a is provided. The connection from the slip rings to the magnets is not shown, this being obvious to one skilled in the art.

The gap between the column and the poles of the magnets should be as small as practicably possible for the mechanical rotation of the wheel. Generally, the air gap between the face of one pole and the closest side of the column would be in the neighborhood of about $\frac{1}{16}$ inch for a rectangular cross section 8" high and 4" across.

Figures 9, 9A:
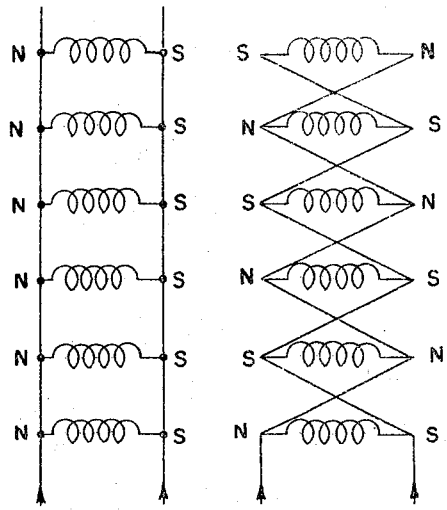
FIGS. 9 and 9a depict two types of electric circuits for the magnets which may be employed in the apparatus of the invention.

The magnets may be arranged as shown in FIG. 7 with all the south poles on one side of the column and all the north poles on the opposite side. When this arrangement is used, it is important that the magnets be spaced apart along the columnar pathway at least sufficient to maintian flux gradients longitudinally of the pathway. If the adjacent magnets are allowed to touch each other, the flux density tends to be uniform such that unbalanced forces are not created on the particles to be concentrated by movement along the column. The circuit for the foregoing arrangement is shown schematically in FIG. 9. FIG. 9a illustrates schematically a circuit in which the poles on each side of the column alternate in polarity. The latter arrangement is preferred as it enables more easily the setting up of desired flux gradients longitudinally of the column.

Figure 12:
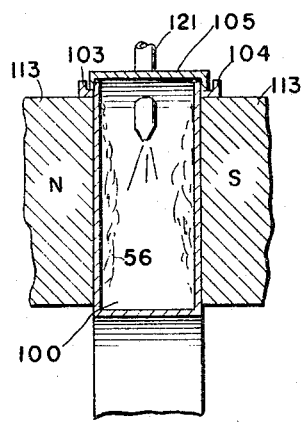

While it is preferred that the column employed be stationary, it will be appreciated that a moving column may likewise be employed in carrying out the invention. Such an embodiment is shown in FIGS. 10 to 12. Since the net effect of a moving column in magnetically concentrating a mineral will be substantially the same as that shown for the embodiment of the stationary column, the details as to the distribution of the material within the column need not be discussed.

In effect, the general configuration of the apparatus will be the same, that is the column is substantially circular in shape, except that the bottom and the two sides of the rectangular cross section of the column is treated as an annular trough fixed integrally between and preferably in contact with the embracing poles of the magnets. This is shown by referring to the partial section of FIG. 11 in which annular trough designated generally by the numeral 100 has its side walls 101, 102 integral with or held fast to the pole faces of the magnets, the top of the trough having annular sealing recesses 103, 104 associated with each of the sides and flanged slightly outward to rest on the upper end surfaces of each of the poles. The sealing recesses are adapted to receive an annular cover 105 flanged downward at ends 106, 107, which ends are adapted to rest in the recesses (note FIG. 12) and supported in sealing engagement therewith by using well known resilient washers or packing, for example natural rubber. In effect, the magnet and wheel combination of FIGS. 5 to 8 now become a magnet, trough and wheel combination, the structure of the wheel with the mounted magnets being in all other respects the same as that for the first embodiment and need not be described, the drawing being sufficient in that regard.

The set-up of this embodiment is partially indicated in FIG. 10 as comprising a wheel designated generally by the numeral 108 whose spokes radiate from hub 110 to rim 109 mounted on rotatable shaft 111. Magnets 112 are fixed to rim 109, annular trough 100 being integrally and rigidly fixed between the poles 113 of the magnet (note FIG. 12). Annular cover 105 is held in place by side supports 114, 115 and by any suspension support (not shown), as may be required depending upon the particular situation. A feed chute 116 is provided integral with the top of the cover (note also FIG. 11) corresponding generally to the function of feed chute 27 of FIG. 5. The stationary cover at the lower left hand portion of the circular column has a downwardly extending portion 117 adapted to receive the tailing, a pump P being provided to insure countercurrent flow of the material. The pump may be adjusted to maintain negative pressure within the column and inhibit the leaking out of any water or other fluid through the annular seal of the cover during operation of the concentrator.

A scraper or baffle 118 is provided at the tailing-receiving portion to aid in the removal of the tailing. At the concentrate-receiving portion of the column, a collector 119 is provided and a scraper 120 to remove the concentrate.

In the case where water is employed as the fluid in the concentration operation for cleaning purposes, water orifices, such as 121, 122, etc. would be provided as in the embodiment of FIG. 5. Where air is used as the fluid, the pump P would be placed by a fan, this also being the case for the embodiment of FIG. 5.

Figure 14:
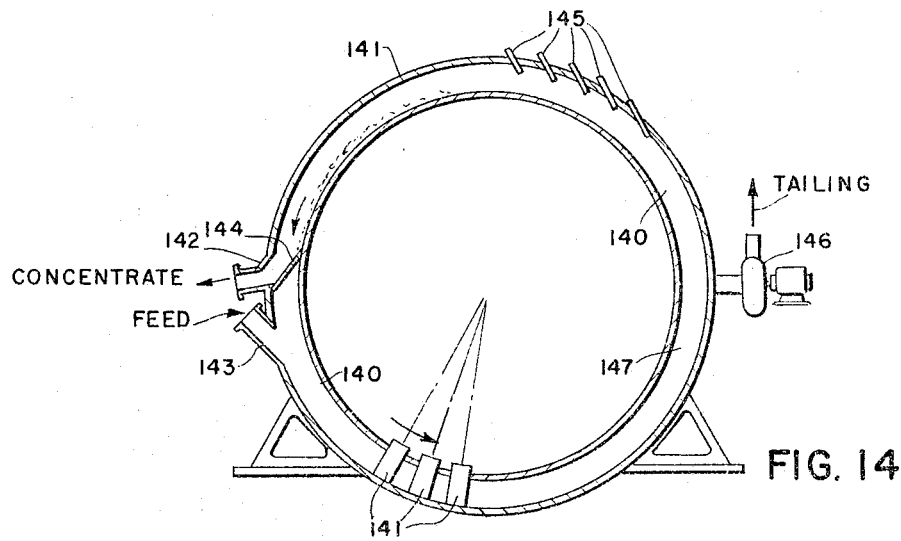
FIG. 14 is similar to FIG. 10, but differs in enabling the use of concurrent flow principles in carrying out the invention.
Figure 13:
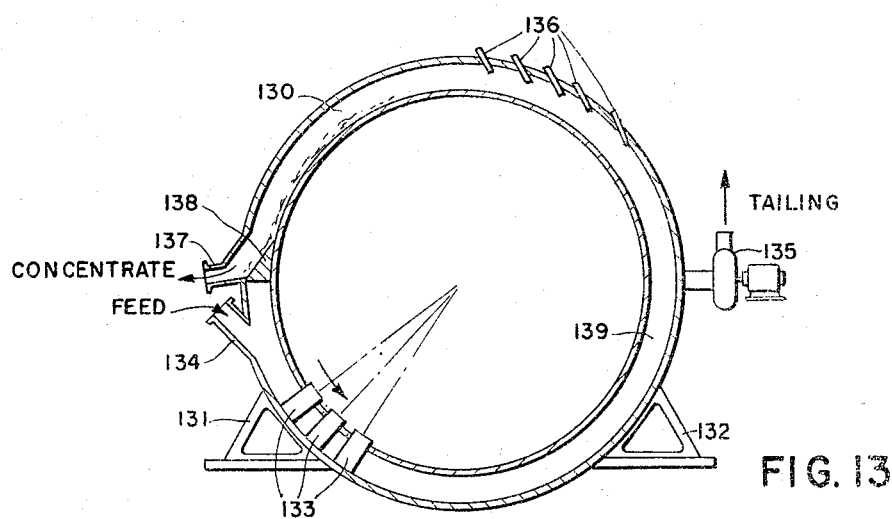
FIG. 13 depicts another form of the apparatus of FIG. 5, but adapted for separation by concurrent flow.

As illustrative of circular columns similar to the types shown in FIG. 5 and FIG. 10, but adapted for separation by means of concurrent flow, reference is made to FIG. 13 and FIG. 14.

FIG. 13 shows a circular stationary column 130 the same in all respects to stationary column 20 of FIG. 5, except for the different placement of the feed means and the discharge means. The column which is supported by abutments 131, 132 is peripherally traversed by magnets 133 mounted on a wheel of substantially the same type shown in FIGS. 6 to 8. Feed-receiving means 134 is provided for feeding material into the column concurrent with the movement of magnets 133, a pump 135 being provided substantially opposite the point of feed to maintain a positive flow in that direction. Fluid inlets 136 are provided at the upper portion of the circular column for injecting air or water depending upon whether the separation is wet or dry. At a portion of the column near the feed-receiving means, a concentrate-receiving portion 137 is provided separated from the feed-receiving means by block-off 138. As the magnets rotate, the magnetic material clinging along the walls and following the movement of the magnets is carried along the circular pathway towards point 137 while being cleaned by fluid, e.g. water, emanating from inlets 136. In the meantime, the tailing-receiving portion 139 of the column is enriched in the tailing which is removed continuously via pump 135.

Concerning FIG. 14, a similar separation is effected by concurrent flow by constructing the column as a moving trough along the lines of FIGS. 10 to 12 with an annular flange serving as a cover. The trough portion 140 of the column is integral with the magnets similarly as shown in FIG. 12, a stationary cover 141 being provided having extending therefrom a concentrate-receiving portion 142 and a feed-receiving portion 143, the concentrate-receiving portion having integral with it a scraper 144 for collecting the magnetic material adhering to the walls of the column. As in FIG. 13, fluid inlets 145 are provided as well as a pump 146 to remove the enriched tailing from tailing-receiving portion 147. As has been stated, the wheel and trough combination will be substantially as shown in FIG. 10 to FIG. 12 except that the wheel will rotate in the same direction as the feed as described in FIG. 13.

In FIGS. 15 to 17, the inverted U type of separator is shown comprising U-shaped column 148 with a tailing-receiving leg portion 149 and a concentrate-receiving leg portion 150. The column has a feed-receiving portion 151 with water inlets 152 just above it. An endless chain 153 is provided motivated by sprockets 154, 155, the chain having magnets 156 mounted therealong as shown.

A power input source 157 is provided which is shown more clearly in FIG. 17 as comprising power input elements 157a, 157b which are in electrical contact with flexible continuous power bus 158 via contact pulley 159, a flexible insulation 160 being provided to avoid any short circuiting of the power against chain element 161 associated with magnets 156. The feed material is adapted to move counterclockwise to the direction of the magnets as shown whereby the magnetic concentrate is carried clockwise to leg 150 while the tailing travels gravimetrically to leg 149.

The relative magnetic attractability of some of the minerals which may be treated by the invention referred to iron as a standard is as follows:

| Substance | Relative Attractability | Group |
|---|---|---|
| Iron (as a standard) | 100.00 | |
| Magnetite | 40.18 | I |
| Franklinite | 35.38 | |
| Ilmenite | 24.70 | |
| Pyrrhotite | 6.69 | |
| Siderite | 1.82 | II |
| Hematite | 1.32 | |
| Zircon | 1.01 | |
| Limonite | 0.84 | |
| Corundum | 0.83 | III |
| Pyrolusite | 0.71 | |
| Manganite | 0.52 | |
| Calamine | 0.51 | |
| Garnet | 0.40 | |
| Quartz | 0.37 | IV |
| Rutile | 0.37 | |
| Cerussite | 0.30 | |
| Cerargyrite | 0.28 | |
| Argentite | 0.27 | |
| Orpiment | 0.24 | |
| Pyrite | 0.23 | |
| Sphalerite | 0.23 | |
| Molybdenite | 0.23 | V |
| Dolomite | 0.22 | |
| Bornite | 0.22 | |
| Apatite | 0.21 | |
| Willemite | 0.21 | |
| Tetrahedrite | 0.21 | |
| Talc | 0.15 | |
| Arsenopyrite | 0.15 | |
| Magnesite | 0.15 | |
| Chalcopyrite | 0.14 | |
| Gypsum | 0.12 | VI |
| Fluorite | 0.11 | |
| Zincite | 0.10 | |
| Celestite | 0.10 | |
| Cinnabar | 0.10 | |
| Chalcocite | 0.09 | |
| Cuprite | 0.08 | |
| Smithsonite | 0.07 | |
| Orthoclase | 0.05 | |
| Stibnite | 0.05 | |
| Cryolite | 0.05 | VII |
| Enargite | 0.05 | |
| Senarmontite | 0.05 | |
| Galena | 0.04 | |
| Niccolite | 0.04 | |
| Calcite | 0.03 | |
| Witherite | 0.02 | |

Assuming a magnetic ore containing 10% magnetite, 10% hematite and the balance quartz or other siliceous material, I am enabled with my process to separate both the magnetite and hematite from the siliceous material in a substantially one step operation. Using a circular column of the type shown in FIG. 5 having an internal diameter of about 8 feet and a rectangular cross section 8″ high by 4″ wide with about 44 magnets disposed along substantially the whole peripheral length of the column, the ore would be fed mixed with water into the column at a feed inlet 27 (FIG. 5) at a calculated rate of about 75 tons/hr., additional water being added at water inlets 32 to 35 to maintain a fluid circulating system counterclockwise towards suction pump 31. The magnets would be set at a high field strength of about 20,000 gauss to insure the recovery of hematite together with magnetite. The magnets would be moved at a linear speed along the column of about 7 feet/second counter to the flow of the material and concentrate collected at collector 29 at the rate of about 14.5 tons/hr., the concentrate containing both magnetite and hematite.

Where it is desired to recover as a concentrate a mineral of magnetic susceptibility lower than quartz, for example minerals such as those shown in groups V to VII of the foregoing table, for instance chalcopyrite, this would be done by using a very high field intensity of above 30,000 gauss selective to the removal of the quartz which, referring to FIG. 5, would be carried to the right of the column and deposited at what normally would be the concentrate end at 29, except that the quartz in this instance would be the tailing. The material of lower magnetic susceptibility would be concentrated at the region 28 of the column (normally the tailing end of the column) and recovered as the concentrate. It is thus apparent that the method and/or apparatus of the invention may also be used in separating as a concentrate a material of magnetic susceptibility lower than that of another material with which it is mixed.

The concentrate-discharge end of the magnetic concentrator should be designed so that the magnetic material concentrated there can be removed readily from the area of magnetic attraction. In some instances, especially at very high field strengths, mere gravity discharge may not be sufficient to insure efficient removal where the magnetic field is continually being applied along the whole length of the column, particularly in the region of or near the discharge end. In that case, it may be necessary to provide high pressure water to forcibly remove the concentrate. Or, if desired, a device may be used as shown in FIGS. 18 and 19.

Figures 18, 19:
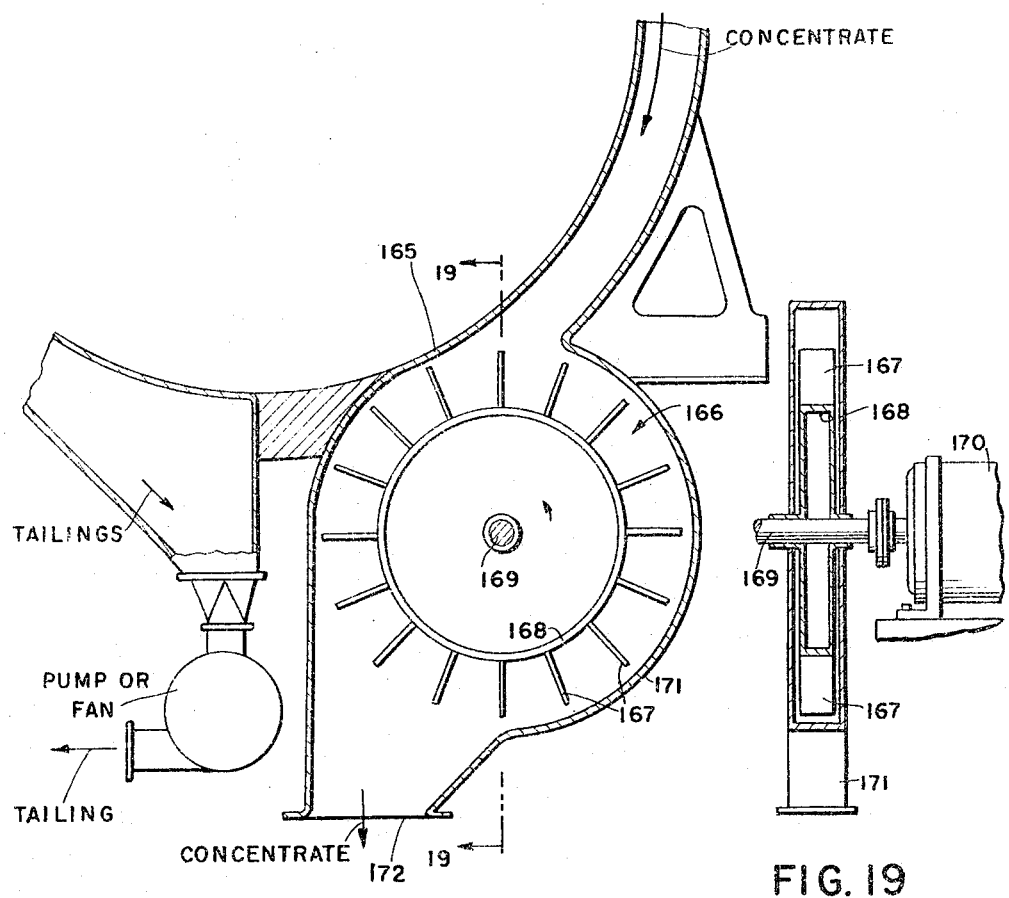
FIGS. 18 and 19 show an embodiment of a concentrate-discharge means which may be employed in the apparatus of the invention.

The circular column illustrated in FIG. 18 is similar to that shown in FIG. 5 and only that portion at the concentrate-receiving end of the column need be discussed. In one embodiment, the concentrate-receiving portion 165 may have associated with it a concentrate-discharging device comprising an axially mounted non-magnetic paddle wheel referred to generally by the numeral 166, said wheel comprising semi-rigid paddles 167 extending radially from periphery 168 of the wheel mounted on shaft 169 driven by motor 170 as shown in FIG. 19 which is a view taken along line 19—19 as shown in FIG. 18. The wheel is mounted within housing 171 (note FIG. 18) and is preferably made of a substantially non-magnetic material, such as fiber glass. As shown in FIG. 18, the paddle wheel is adapted to collect the concentrate and positively withdraw it through outlet 172 at the bottom of housing 171.

Since my apparatus is capable of universal application over a wide range of field intensities, say up to 40,000 gauss, it may be necessary to design the electromagnets to allow for dissipation of heat generated within the windings. This means incorporating within the windings an efficient heat conductor. Where the amount of heat to be dissipated corresponds up to about 5 kw. of energy (let us say from an electromagnet having 10,000 turns in the winding and used to generate up to 15,000 gauss), one method of achieving this would be to wind the coils in plies of 100 turns each and separate each of the plies with a metal of good heat conductivity, e.g. aluminum, and allowing the metal to protrude outwards from the coil in the form of radiating fins, provisions being made for cooling fans to circulate air about the fins. At higher current inputs corresponding to the higher range of field intensities, it may be necessary to resort to liquid cooling. In that case hollow copper tubing may be wound at various positions in the winding and the tubing connected to a source of circulating liquid such as oil or water.

Another method would be to wind the coil segmentally in the shape of discs about the core and separate or sandwich each disc winding on a core with a disc of metal of high heat conductivity, the metal disc being exposed to circulating air or other cooling means.

The poles of the magnets would be configurated to yield the required field strength. For high magnetic intensities known special alloys together with tapering the poles will yield the required high intensity field. As has been stated hereinbefore, the magnets should be separated from each other along the column at a distance at least sufficient to insure magnetic gradients throughout the length of the column.

While the columns are shown as having a rectangular cross section, other cross sectional shapes may be employed. However, I prefer to use columns having a rectangular cross section in which the height of the cross section is greater than the width, preferably a ratio of at least 2:1. For example, a rectangle 8" high and 4" wide may be employed. Of course, the smaller the width (i.e. the smaller the gap between pole faces), the less will be the power input required to maintain a desired field strength across the poles. Thus, a rectangular cross section 16" high and 2" wide and having substantially the same production capacity as an 8" by 4" cross section, other things being equal, might be preferred. In other words, as small a distance between pole faces (i.e. gap) is desirable consistent with high production rate and high separation efficiency.

It will be appreciated that in situations where a relatively high magnetic field strength of up to about 50,000 gausses is employed in carrying out the invention, the forces acting on the particles normal to the inside face of the stationary casing may give rise to rather high frictional forces along said face. As will be readily understood, this may lead to wearing of the casing due to adhering particles moving therealong under the magnetic attraction of the moving magnets outside the casing. In such situations, I provide another embodiment of a casing in which I utilize a pair of movable sides within the casing comprising a flat annular ring adjacent one face of the casing and a flat annular ring adjacent the other face of the casing. As the magnetic material is attracted to the side faces of the movable rings and held there by the magnets, the rings are caused to rotate as the magnets rotate. Thus, there is substantially no relative movement between the attracted magnetic particles and the movable faces of the casing since the particles are held fast to the movable faces, whereby wearing is substantially avoided.

Figure 8A:
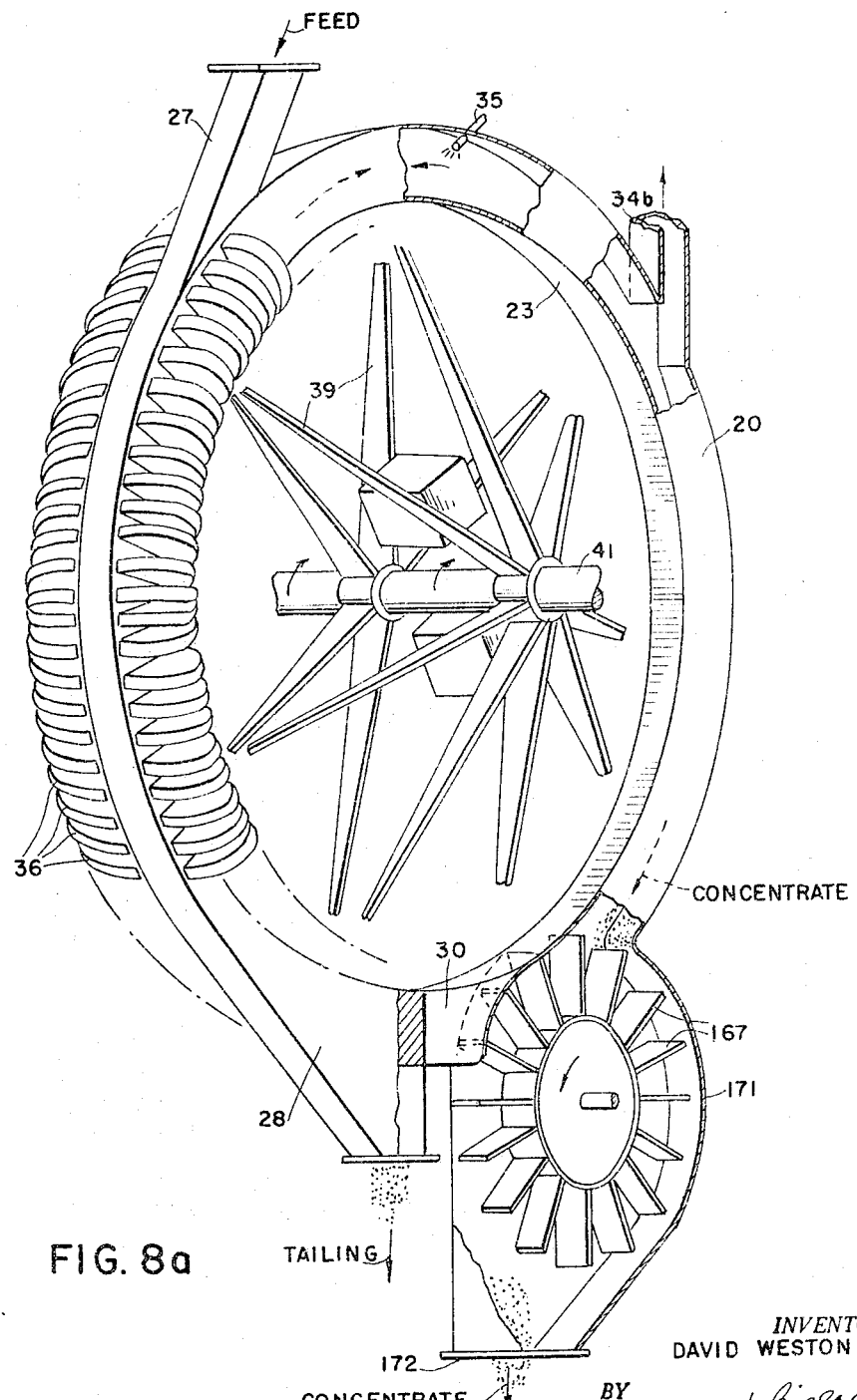
FIGS. 8a and 8b are similar to FIGS. 5 to 8, but differ in showing more truly the preferred embodiment of the invention, like parts being designated with the same numerals.
Figure 8B:
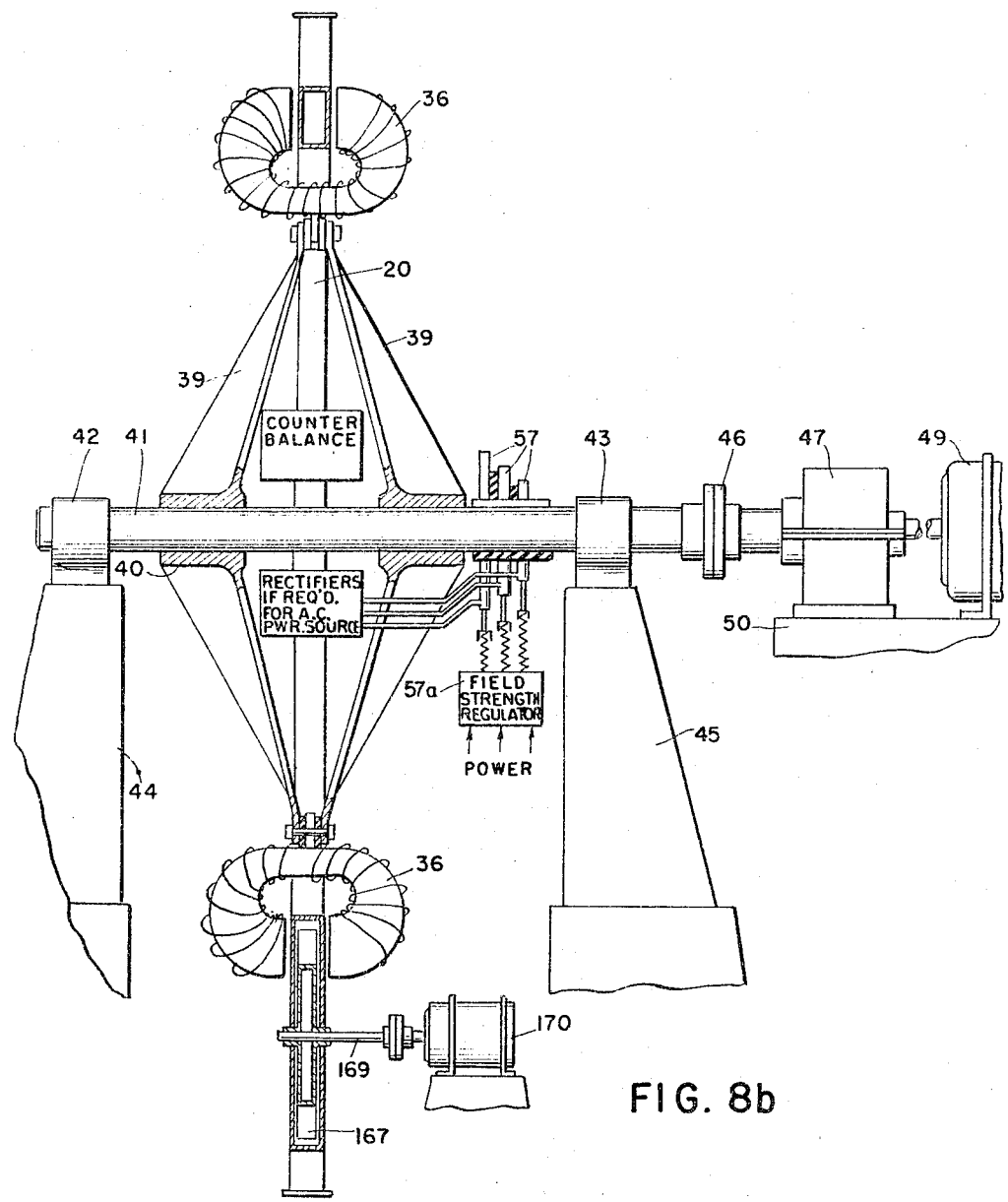

One embodiment of the foregoing is shown in FIGS. 20 to 24. Referring to FIG. 20, the rectangular cross section of a circular column 175 is shown of the type depicted in FIG. 8a, the side walls 176 and 177 of which are substantially embraced by the south and north poles of magnet 178. Within the column is a pair of rotatably movable flat annular rings 176a and 177a supported adjacent side walls 176 and 177 respectively.

The movable annular members are preferably made of low friction non-magnetic material, such as Teflon (polytetrafluoroethylene). The surface of the annular rings adjacent the side walls of the column is striated with grooves 179 so as to limit contact with the side walls to the top points of the striations and thus maintain friction to a minimum. Each of the movable sides (note also FIGS. 21 and 21a), is provided with inner and outer gaskets 180 inserted in annular gasket-retaining grooves 181, the gaskets being adapted to glide along the inside walls 176 and 177 of the column. The gaskets are preferably made of asbestos impregnated with graphite. At the base of the gasket-retaining groove, I provide as an additional feature an annular ring of magnetic material 182, such as iron, having as its purpose to apply a force against the gasket by virtue of its magnetic attraction to the pole of the magnet so as to maintain the gasket in sealing contact with the side walls of the column. The gasket-retaining grooves are preferably undercut as shown in FIG. 21a so that the gaskets are securely held in place and yet, because of their resilience, are maintained in sealing engagement against the inside face of the column.

In operation, the particulate material 56 is attracted to the face of movable walls 176a and 177a and held there. As the magnets rotate (note FIG. 8a), the magnetic force acting upon the particulate material causes the movable walls to rotate along with the magnetically held material.

The structure of the apparatus at the discharge section (note block-off 30 in FIG. 8a) relative to movable annular walls 176a and 177a is shown in FIGS. 22 to 24. Referring to FIG. 22, a three-dimensional fragment of the discharge section is illustrated showing movable walls 176a, 177a positioned relatively to block 30 and side walls 176, 177. A section of paddle wheel 168 is shown as in FIG. 8a with paddles 167 for forcefully removing the concentrate build-up at the block. As shown in FIG. 23, a space is provided between block 30 and side walls 176, 177 to permit movable walls 176a, 177a to move along the sides of the block. In order to prevent any concentrate and fluid from slipping past the block, wiping seals are provided biased against the side of the movable wall. A preferred seal structure is shown in FIG. 24 which is a view taken along line 24—24 of FIG. 23.

Referring to FIG. 24, block 30 is shown having diagonally positioned fingers or seals 183, each connected via a channel 184 to an accumulator 185 adapted to feed air under pressure from a supply line (not shown) to each of rubber fingers 183 whereby to compress them against the sides of the movable walls and wipe off the concentrate therefrom.

As has been stated hereinbefore, in some instances, especially at very high field strengths, mere gravity discharge may not be sufficient to insure efficient removal where the magnetic field is continually being applied along the whole length of the column, particularly near the discharge end. One method proposed to insure removal is to provide means for automatically shutting off the power to a selected group of magnets at the zone or sector embracing the discharge end. This is illustrated somewhat diagrammatically in FIG. 26 where the discharge portion 186 is shown covering a fairly large sector of the circular casting.

I prefer at high field strengths to discharge the concentrate by centrifugal force, for example, by using a magnetic force of repulsion. Thus, as the magnets reach the discharge sector or zone shown in FIG. 26, the magnetizing current is reversed by applying a bucking voltage to reverse the field of a selected group of the magnets and centrifugally discharge the concentrate. Coupled with the foregoing, I may also use the paddle or similar means shown in FIGS. 8a and 18 to augment the removal of the concentrate.

In situations calling for very high flux densities, I may employ winding material made of cryogenic metals whose electrical resistivity decreases perceptibly at progressively lower temperatures. As the material becomes more superconductive, its ability to carry more current increases, the amount of current being limited by the size of the conducting wire and the magnetic field. Ductile conductors are preferred.

Examples of ductile materials which on cooling to low temperatures, e.g. to —30° F. and lower, include most ductile elemental metals and special alloys, such as alloys of columbium-zirconium, columbium-tin, etc. At very low cryogenic temperatures, a Cb-Zr alloy containing 25% Zr has produced fields as high as 68 kilogausses. Thus, in a typical magnet system, a field of 50 kilogausses may be produced by a few pounds of Cb-Zr wire at cryogenic temperatures, whereas with copper wire a weight of several or more tons may be required for an equivalent magnetic system.

For temperatures of operation in the neighborhood of about —30° F., I may use refrigerated circulating brine as the coolant. For cryogenic temperatures below —30° F., I may use a circulating coolant comprising liquid nitrogen, helium, hydrogen, etc.

Referring now to FIG. 25, I show the south and north poles of a magnet having copper cooling tubes 187 coiled about them, the coil being separated from the windings by a thin layer of insulation 188. The coils are insulated from the ambient environment by a covering insulation 189 shown at the top of FIG. 25, the insulation continuing to the bottom of the coil but which has been omitted in the drawing for purposes of clarity.

While the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for the magnetic separation of particulate material characterized by different magnetic susceptibilities which comprises feeding said material into an elongated columnar pathway, subjecting substantially the entire cross-section of said columnar pathway throughout at least its material recovery length to an externally produced magnetic flux characterized by magnetic gradients along at least said material recovery length and which magnetic flux across substantially said entire cross-section is of an intensity selective of a material of a particular magnetic susceptibility whereby to magnetize substantially all of said material of said particular magnetic susceptibility, confining at least said material recovery length of said pathway between a plurality of pairs of poles of opposite polarity producing said flux, moving said poles lengthwise of the pathway countercurrent to the flow of feed material to perform concentration lengthwise along at least said material recovery length, whereby a magnetic concentrate and tailing are formed longitudinally remote from each other along said material recovery length, and collecting said concentrate and collecting said tailing.

2. A method for the magnetic separation of particulate material characterized by different magnetic susceptibilities which comprises feeding said material into an elongated columnar pathway, subjecting substantially the entire cross-section of said columnar pathway throughout at least the material recovery length to an externally produced magnetic flux characterized by magnetic gradients along at least said material recovery length and which magnetic flux across substantially said entire cross section is of an intensity selective of a material of particular magnetic susceptibility whereby to magnetize substantially all of said material of said particular magnetic susceptibility, confining at least said material recovery length of said pathway between a plurality of pairs of poles of opposite polarity producing said flux, said magnetic poles being spaced with their poles alternating in polarity along one side of the pathway and similarly alternating along the other side of the pathway, with north and south poles opposite each other across the pathway, the distance between alternating poles along each side of the pathway being at least sufficient to provide a series of flux gradients therealong, moving said poles lengthwise of the pathway to perform concentration lengthwise along at least said material recovery length, whereby a magnetic concentrate and tailing are formed longitudinally remote from each other along said material recovery length, and collecting said concentrate and collecting said tailing.

3. A method for the magnetic separation of particulate materials characterized by different magnetic susceptibilities which comprises feeding said material into an elongated pathway of circular configuration, subjecting substantially the entire cross-section of said columnar pathway throughout at least its material recovery length to an externally produced magnetix flux characterized by magnetic gradients along at least said material recovery length and which magnetic flux across substantially said entire cross section is of an intensity selective of a material of a particular magnetic susceptibility whereby to magnetize substantially all of said material of said particular magnetic susceptibility, confining at least said material recovery length of said circular pathway between a plurality of pairs of poles of opposite polarity producing said flux, moving said poles along the peripheral length of the pathway countercurrent to the flow of feed material with said movement guided about the radial center of said circular pathway to perform concentration along at least said material recovery length of said columnar pathway, whereby a magnetic concentrate and tailing are formed longitudinally remote from each other in separate portions of said pathway, and collecting said concentrate and collecting said tailing.

4. Apparatus for the magnetic separation of particulate material characterized by different magnetic susceptibilities into at least one concentrate and at least one tailing which comprises in combination a non-magnetic shell enclosing an elongated column of rectangular cross-section having at least a material recovery length for confining and concentrating said materials, feed means associated with a portion of said column, discharge means for said concentrate and for said tailing associated with other portions of said column, and magnetic flux producing means comprising a plurality of pairs of pole faces of opposite polarity substantially wholly embracing said shell on opposite sides of said material recovery length of said column adapted to produce a flux substantially across the entire cross section thereof characterized by magnetic gradients at least along said length of an intensity sufficient to magnetize such of said material as has a particular magnetic susceptibility, means for moving said magnetic flux producing means longitudinally of said column, the discharge means for removing the concentrate comprising a housing with a rotatable paddle wheel mounted therein, the blades of which move within the region where the concentrate is collected and thereby remove it.

5. Apparatus for the magnetic separation of particulate material characterized by different magnetic susceptibilities into at least one concentrate and at least one tailing which comprises in combination a non-magnetic shell enclosing an elongated column having at least a material recovery length for confining and concentrating said materials, feed means associated with a portion of said column, discharge means for said concentrate and for said tailing associated with other portions of said column, and magnetic flux producing means comprising a plurality of pairs of pole faces of opposite polarity substantially wholly embracing said shell on opposite sides of said material recovery length of said column adapted to produce a flux substantially across the entire cross section thereof characterized by magnetic gradients at least along said length of an intensity sufficient to magnetize such of said material as has a particular magnetic susceptability, the plurality of pairs of pole faces comprising a series of spaced U-shaped electromagnets whose legs embrace transversely opposite sides of the shell enclosing said elongated column with the pole faces of each of said magnets opposing each other with the north and south poles of the spaced magnets alternately arranged along one side of the column and similarly alternately arranged along the other side thereof, the distance between the spaced poles along the column being at least sufficient to provide a series of flux gradients therealong, and means for moving said magnetic flux producing means longitudinally of said column.

6. The apparatus of claim 5 wherein the shell enclosing column and the magnets form an integral unit and are adapted to move together longitudinally in the direction of the column.

7. Apparatus for the magnetic separation of particulate materials characterized by different magnetic susceptibilities into at least one concentrate and at least one tailing which comprises in combination an elongated non-magnetic shell enclosing a column of circular shape having at least a material recovery length for confining and concentrating said materials, said column having a rectangular cross section, feed means communicating with a portion of said column, discharge means for said concentrate and for said tailing associated with other portions of said column, and magnetic flux producing means comprising a plurality of pairs of pole faces of opposite polarity substantially wholly embracing said shell on opposite sides of said material recovery length of said column adapted to produce a flux substantially across entirely the cross section thereof characterized by magnetic gradients along at least said material recovery length of the column of an intensity sufficient to magnetize such of said material as has a particular magnetic susceptibility, and means for moving said magnetic flux producing means peripherally about said column, the discharge means for removing the concentrate being a device formed of substantially non-magnetic material and comprising a housing with a rotatable paddle wheel mounted therein, the blades of which move within the region where the concentrate is collected and thereby remove it.

8. Apparatus for the magnetic separation of particulate materials characterized by different magnetic susceptibilities into at least one concentrate and at least one tailing which comprises in combination an elongated non-magnetic shell enclosing a column of circular shape having at least a material recovery length for confining and concentrating said materials, feed means communicating with a portion of said column, discharge means for said concentrate and for said tailing associated with other portions of said column, and magnetic flux producing means comprising a plurality of pairs of pole faces of opposite polarity substantially wholly embracing said shell on opposite sides of said material recovery length of said column adapted to produce a flux substantially across entirely the cross section thereof characterized by magnetic gradients along at least said material recovery length of the column of an intensity sufficient to magnetize such of said material as has a particular magnetic susceptibility, said pole faces comprising a series of U-shaped electromagnets whose legs embrace transversely opposite sides of the shell enclosing said column with the pole faces of each of said magnets opposing each other adjacent said sides of the shell, and means associated with said magnets for moving said magnets in the peripheral direction of said column including guide means associated with the radial center of said circular column for maintaining the peripheral movement of said magnets.

9. The apparatus of claim 8 wherein the spaced magnets have their north poles along one side of the column and their south poles along the other side of said column, the distance between the spaced poles along the column being at least sufficient to provide a series of flux gradients therealong.

10. The apparatus of claim 8 wherein the north and south poles of the spaced magnets are alternately arranged along one side of the column and similarly alternately arranged along the other side thereof, the distance between the spaced poles along the column being at least sufficient to provide a series of flux gradients therealong.

11. The apparatus of claim 8 wherein said magnets are integrally associated with a rim of a wheel supported on a shaft passing transversely through the radial center of said circular column, said wheel being adapted to rotate about said center, whereby the magnets are enabled to move in the peripheral direction of said column.

12. The apparatus of claim 11 wherein the magnets are spaced along the rim of the wheel at least at a distance to provide magnetic gradients peripherally along the column.

13. The apparatus of claim 8 wherein said circular column is stationary and along the periphery of which said magnets move.

14. The apparatus of claim 8 wherein the shell enclosing said circular column and the magnets form an integral unit and move together peripherally in the direction of the column.

15. Apparatus for the magnetic separation of particulate materials characterized by different magnetic susceptibilities into at least one concentrate and at least one tailing which comprises in combination a non-magnetic shell enclosing an elongated column of circular shape having a material recovery length for confining and concentrating said materials, said column having a rectangular cross section the height of which is larger than the width, feed means communicating with a portion of said column, discharge means for said concentrate and for said tailing communicating with other portions of said column and magnetic flux producing means comprising a plurality of pairs of pole faces of opposite polarity substantially wholly embracing said shell on opposite sides of the material recovery length of said column adapted to produce a flux substantially across the entire rectangular cross section thereof, and characterized by magnetic gradients along said length of intensity sufficient to magnetize such of said material as has a particular magnetic susceptibility, and means for moving said magnetic flux producing means peripherally about said column countercurrent to the flow of feed material.

16. The apparatus of claim 8 wherein the pathway of said circular column is rectangular in cross section and wherein said column has contained therein a pair of rotatably movable flat annular rings, one ring being disposed adjacent one side wall of said column, the other of said rings being disposed adjacent a side wall opposite said one side wall.

17. The apparatus of claim 16 wherein each of said rings are provided with gasket-retaining annular means with gasket means associated therewith for engaging the side walls of the column.

18. The apparatus of claim 17 wherein the gasket retaining means of the movable rings have associated therewith a ring of magnetic material.

19. The apparatus of claim 17 wherein the material forming the gasket means comprises asbestos and graphite.

20. The apparatus of claim 16 wherein the discharge means has a stationary block adjacent thereof for preventing concentrate from being carried past the discharge means, said block being disposed in the column between said pair of movable flat rings.

21. The apparatus of claim 20 wherein said block has associated therewith sealing means in wiping and sealing engagement with said movable flat annular rings.

22. The apparatus of claim 17 wherein the face of each of the flat annular rings adjacent the side walls of the column are striated to provide less contact area with the side walls of the column.

23. The apparatus of claim 17 wherein the flat annular rings are formed of low friction material.

24. The apparatus of claim 23 wherein the low friction material comprises polytetrafluoroethylene.

25. The apparatus of claim 8 wherein the magnets are provided with means to effect the cooling thereof.

26. The method of claim 1 wherein the plurality of poles are electromagnets and wherein the collection of the concentrate is effected by shutting off the current to a selected group of the magnets after the concentration has been performed lengthwise of said material recovery length.

27. The method of claim 1 wherein the plurality of poles are electromagnets and wherein the collection of the concentrate is effected by reversing the current to a selected group of the magnets after the concentration has been performed lengthwise of said material recovery length.

References Cited by the Examiner
UNITED STATES PATENTS

| | | | |
|---|---|---|---|
| 478,551 | 7/1892 | Ball et al. | 209—219 X |
| 571,362 | 11/1896 | Hamilton | 209—229 |
| 731,443 | 6/1903 | Eriksson | 209—222 |
| 1,978,509 | 10/1934 | Roberts | 210—223 |
| 2,282,510 | 5/1942 | Begor | 209—222 |
| 2,652,925 | 9/1953 | Vermieren | 210—222 |
| 2,714,960 | 8/1955 | Schmid | 209—227 |
| 2,863,538 | 12/1958 | Jaeschke | 317—159 |
| 2,979,202 | 3/1961 | Orbeliani | 210—222 X |
| 3,087,616 | 3/1963 | Pierson | 209—221 |
| 3,111,484 | 11/1963 | Cavanagh | 209—227 |

OTHER REFERENCES

Eng. and Min. Journal, 152, No. 10, October 1951, pages 82, 83, 118.

HARRY B. THORNTON, *Primary Examiner.*

R. HALPER, *Assistant Examiner.*